UNITED STATES PATENT OFFICE.

BENJAMIN F. BURKE, OF SULLIVAN, INDIANA.

IMPROVEMENT IN SOAP COMPOUNDS.

Specification forming part of Letters Patent No. 159,640, dated February 9, 1875; application filed November 14, 1874.

*To all whom it may concern:*

Be it known that I, BENJAMIN F. BURKE, of Sullivan, in the county of Sullivan and State of Indiana, have invented certain new and useful Improvements in Compounds for Making Soap; and I do hereby declare that the following is a full, clear, and exact description thereof, which will enable others skilled in the art to which it pertains to make and use the same.

This invention consists of certain ingredients compounded in the manner and proportions substantially as hereinafter more fully set forth.

It is used in washing and cleansing fabrics, gloves, &c.

Take four (4) pounds of soda-ash, two (2) pounds of unslaked lime, and two (2) ounces each of bromide of potassium and muriate of ammonia, and put in a kettle containing twelve (12) gallons of soft water, and heat until it begins to boil. Take the kettle off and let its contents settle, after which dip off the solution and return it to the kettle, when the grease is put in, and the whole allowed to boil until thick. After taking it from the fire put in two (2) ounces each of saltpeter and linseed oil, and one (1) ounce of borax.

If soft soap is needed leave out the three last-named ingredients, and substitute in their stead four (4) ounces of benzine after it has cooled a little.

To make a less or larger quantity, diminish or increase the ingredients proportionably.

This will make a compound or preparation that will be very cheap, that will hold its body well, and that will not evaporate.

Having thus described my improved compound or invention, what I claim, and desire to secure by Letters Patent, is—

The improved soap compounded of soda-ash, unslaked lime, bromide of potassium, muriate of ammonia, water, saltpeter, linseed-oil, and borax, substantially as specified.

In testimony whereof I have hereunto signed my name in presence of two subscribing witnesses.

BENJAMIN F. BURKE.

Witnesses:
   N. G. BUFF,
   WILLIAM A. BURKE.